(12) United States Patent
Mischler

(10) Patent No.: US 8,662,802 B2
(45) Date of Patent: Mar. 4, 2014

(54) HIGH RIGIDITY MOVING COLUMN HORIZONTAL MACHINE TOOL

(75) Inventor: Peter L. Mischler, Rockton, IL (US)

(73) Assignee: Fives Machining Systems, Inc., Fond du Lac, WI (US)

( * ) Notice: Subject to any disclaimer, the term of this patent is extended or adjusted under 35 U.S.C. 154(b) by 506 days.

(21) Appl. No.: 13/040,368

(22) Filed: Mar. 4, 2011

(65) Prior Publication Data

US 2012/0224931 A1 Sep. 6, 2012

(51) Int. Cl.
| B23C 1/027 | (2006.01) |
| B23Q 5/40  | (2006.01) |
| B23Q 1/25  | (2006.01) |
| B23Q 1/01  | (2006.01) |

(52) U.S. Cl.
USPC ........... 409/235; 408/234; 408/216; 408/185; 408/189

(58) Field of Classification Search
USPC ......... 409/235, 236, 183, 185, 189, 204, 206, 409/201, 211, 216; 408/234
See application file for complete search history.

(56) References Cited

U.S. PATENT DOCUMENTS

| 2,564,180 A   | 8/1951  | F. Turrettini |
| 2,768,558 A * | 10/1956 | Dubosclard ................... 409/109 |
| 3,800,636 A   | 4/1974  | Zagar |
| 4,858,290 A   | 8/1989  | Hirose et al. |
| 5,252,011 A   | 10/1993 | Corsi |
| 5,265,497 A   | 11/1993 | Curless |
| 5,375,952 A   | 12/1994 | Line |
| 5,394,604 A   | 3/1995  | Corsi |
| 5,938,577 A   | 8/1999  | Lindem |
| 6,113,324 A   | 9/2000  | Huber |
| 6,161,995 A   | 12/2000 | Wakazono et al. |
| 6,273,653 B1  | 8/2001  | Horn et al. |
| 6,519,823 B1  | 2/2003  | Sugata et al. |
| 6,551,038 B1  | 4/2003  | Sugata et al. |
| 6,582,278 B1  | 6/2003  | Kroll et al. |
| 6,623,222 B1* | 9/2003  | Kroll et al. ..................... 409/235 |
| 6,843,624 B2  | 1/2005  | Sugata et al. |

(Continued)

FOREIGN PATENT DOCUMENTS

| DE | 19645324 A1   | 5/1998 |
| EP | 816012 A1 *   | 1/1998 |

(Continued)

OTHER PUBLICATIONS

EP Search Report EP 12157900; dated May 30, 2012; 3 pages.

*Primary Examiner* — Erica E Cadugan

(74) *Attorney, Agent, or Firm* — Reising Ethington P.C.

(57) ABSTRACT

A rigid design for a machine tool having perpendicular X, Y, and Z axes includes fixed X-axis frame members at the back of the machine, fixed Z-axis vertical frame members at the front of the machine, and fixed upper and lower Z-axis frame members rigidly attached to the fixed X-axis frame members and the fixed Z-axis vertical frame members. The frame members form a fixed, rigid, closed force loop design. A movable Y-axis column is bifurcated and a headstock is mounted in the center opening of the column. The headstock is advanced and retracted relative to the workpiece by moving the Y-axis column and the headstock relative to the workpiece. Because the headstock is fixed relative to the Y-axis column, the unsupported portion of the headstock relative to the Y-axis column does not change as the Z-axis position of the headstock changes relative to the workpiece.

10 Claims, 2 Drawing Sheets

(56) References Cited

U.S. PATENT DOCUMENTS

| | | |
|---|---|---|
| 7,189,194 B1 | 3/2007 | Takayama et al. |
| 7,273,335 B2 | 9/2007 | Furuhashi et al. |
| 7,437,810 B2 | 10/2008 | Ota |
| 7,509,718 B1 | 3/2009 | Mischler et al. |
| 7,534,078 B1* | 5/2009 | Mischler ........................ 409/235 |
| 7,547,270 B1* | 6/2009 | Mischler et al. .............. 409/235 |
| 2002/0104935 A1 | 8/2002 | Schweizer |
| 2003/0190206 A1 | 10/2003 | Sugata et al. |
| 2006/0130311 A1 | 6/2006 | Kikuchi |
| 2006/0260907 A1 | 11/2006 | Ota |
| 2006/0269375 A1 | 11/2006 | Takayama et al. |
| 2007/0042882 A1 | 2/2007 | Konvicka et al. |
| 2008/0044246 A1 | 2/2008 | Gueli et al. |
| 2009/0252581 A1* | 10/2009 | Mischler et al. .......... 414/222.05 |
| 2009/0252587 A1* | 10/2009 | Mischler et al. .............. 414/704 |
| 2011/0008121 A1* | 1/2011 | Miyazaki et al. .............. 409/135 |

FOREIGN PATENT DOCUMENTS

| | | |
|---|---|---|
| EP | 1609562 A1 | 12/2005 |
| EP | 1731260 A1 | 12/2006 |
| JP | 2279249 A | 11/1990 |
| JP | 4283037 A | 10/1992 |
| JP | 2003266257 A | 9/2003 |

* cited by examiner

HIGH RIGIDITY MOVING COLUMN HORIZONTAL MACHINE TOOL

FIELD

A horizontal machine tool has a closed force loop design, a moving bifurcated Y-axis column that moves in the Z-axis, and an X-slide configuration that supports the workpiece and optimizes the rigidity of the machine.

BACKGROUND

A plate mill is a type of machine tool that is used to machine large flat workpieces having a substantial length and width, but relatively little height. Because the workpiece is large, the plate mill itself is relatively large, and in large machines, rigidity and the ability to resist deformation during operation are important design considerations. It is also important in high performance machines that the rigidity of the machine remain as constant as possible throughout the working range of the machine. This allows for optimal process parameters to be utilized throughout the envelope of machine operation instead of having to vary the process parameters depending on the location of the working tool in the workzone.

SUMMARY OF THE DEVICE

The frame of a machine tool is configured to form a closed force loop design that surrounds a workzone containing the headstock and a Y-axis column that moves in the Z-axis. The front of the loop comprises vertical fixed Z-axis frame members and the back of the loop comprises fixed X-axis frame members. The top and bottom of the loop are formed by upper and lower Z-axis frame members that tie the front fixed Z-axis frame members and the rear X-axis frame together. A pallet receiver that supports the workpiece is mounted to move on X-axis rails that are mounted on the X-axis frame members. A headstock such as a spindle or multi-axis head is mounted on a vertically movable slide or saddle that is supported on the movable Y-axis column. The overhang of the spindle on the Y-axis column remains constant relative to the Y-axis column throughout the Z-axis stroke of the machine, and adds to the rigidity of the machine.

The X and Z-axis drive motors are all mounted outside of the workzone. The X-axis drive is mounted on a fixed wall that is attached to X-axis frame members. The Z-axis drive motors are mounted on the upper and lower Z-axis frame members on the opposite side of the Z-axis frame members from the workzone. The positioning of the X and Z-axis drives on stationary parts of the machine adds to the rigidity of the machine, and eliminates the need for flexible cables to power and control these drives.

BRIEF DESCRIPTION OF THE DRAWINGS

FIG. 3 schematically shows the embodiment wherein the headstock is in the form of a multi-axis head.

DETAILED DESCRIPTION

Figure 1:
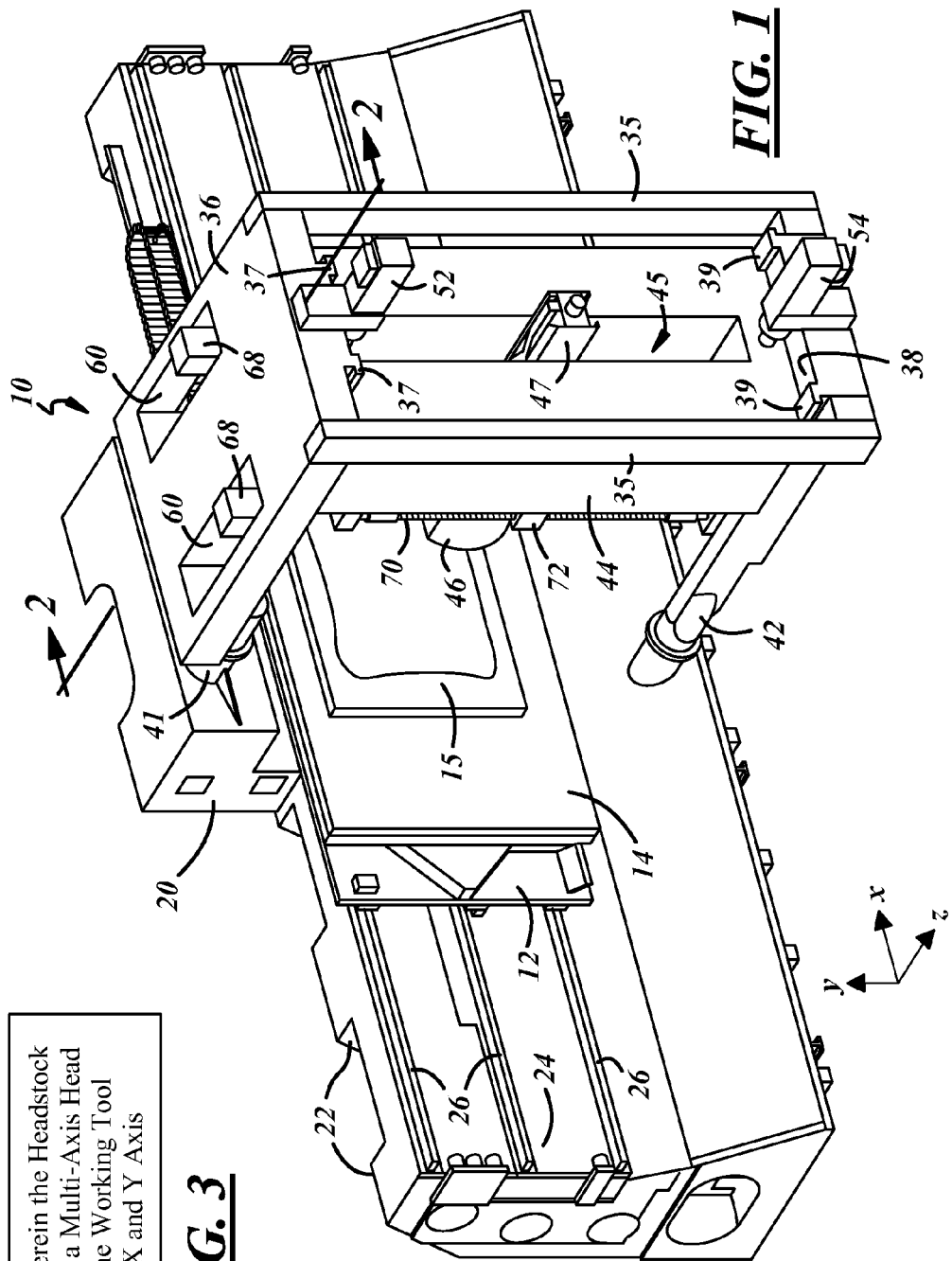
FIG. 1 is a perspective view of a horizontal machine tool.

FIG. 1 shows a machine tool generally designated by the reference numeral 10. The machine tool is normally surrounded by standard guarding, not shown, to contain the debris created during machining a workpiece, and to protect personnel who may be operating the machine. An operator station, also not shown, is normally positioned outside of the guarding. The machine tool 10 includes a pallet receiver 12 that receives a pallet 14 with a workpiece 15 mounted thereon from a pallet delivery mechanism, not shown, that is not part of the machine tool. After receiving a workpiece 15, the pallet receiver 12 may be driven to the work zone of the machine in front of the headstock and the working tool.

The back of the machine tool is formed by X-axis frame members 20 and 22 that support an X-axis wall 24. A plurality of X-axis rails 26 are mounted on the X-axis wall 24. The X-axis rails 26 extend from one side of the machine to the other to support the pallet receiver 12 and to position the pallet 14 in front of the working tool. In this view, the pallet 14 and the pallet receiver 12 are centered in front of the Y-axis column 44. The pallet receiver 12 is mounted on the X-axis rails 26 for horizontal movement along the X-axis. One or more X-axis drive motors 28, best seen in FIG. 2, are mounted on the opposite side of the X-axis wall 24 from the pallet receiver 12 and are used to drive the pallet receiver back and forth along the X-axis rails 26.

The front of the machine is formed by fixed vertical Z-axis frame members 35. The X-axis frame members 20 and 22 are coupled to the Z-axis frame members 35 by fixed upper and lower Z-axis frame members 36 and 38, and by upper and lower connection tubes 41 and 42, respectively, to form a rigid closed loop force design. In other designs, the upper and lower Z-axis frame members 36 and 38 may be extended to connect directly to the X-axis frame members 20 and 22, eliminating the need for the upper and lower connection tubes 41 and 42. The fixed upper and lower Z-axis frame members 36 and 38 are formed with upper and lower horizontal Z-axis ways 37 and 39, respectively, which support and guide the movement of the Y-axis column 44. The Y-axis column 44 is formed with a center opening 45 that accommodates the utilities portion 47 of a saddle or slide 49 best seen in FIG. 2. The saddle 49 supports a headstock such as a spindle or multi-axis head 46. The pallet 14 with a workpiece 15 is positioned in front of the headstock 46 that carries the working tool 48 and this establishes a workzone 50 best seen in FIG. 2. The workzone 50 is contained within the closed force loop formed by the X-axis frame members 20 and 22, the vertical Z-axis frame members 35, the upper and lower Z-axis frame members 36 and 38, and the connection tubes 41 and 42. The headstock 46 may comprise a spindle or a multi-axis head. If the headstock 46 is a spindle, the working tool 48 is always parallel to the Z-axis. If the headstock 46 is a multi-axis head, the working tool 48 may be pivoted about the X and Y axis, so that it is at an angle to the Z-axis.

The Y-axis column 44 is mounted between the upper and lower Z-axis frame members 36 and 38. The Y-axis column 44 is movable in the Z direction and is bifurcated to form the center opening 45. A Z-axis drive assembly for the bifurcated column 44 comprises upper and lower servomotors 52 and 54 and drive screws 53 and 55, best seen in FIG. 2, which are mounted on the upper and lower Z-axis frame members 36 and 38. The Z-axis servomotors 52 and 54 may be selectively controlled to position the Y-axis column 44 and the working tool 48 in the desired position along the Z-axis of the machine. The upper Z-axis frame member 36 is formed with slots 60 to accommodate the Y-axis drive motors 68 that are used to vertically position the saddle 49 and the headstock 46 as described more fully below.

Figure 2:
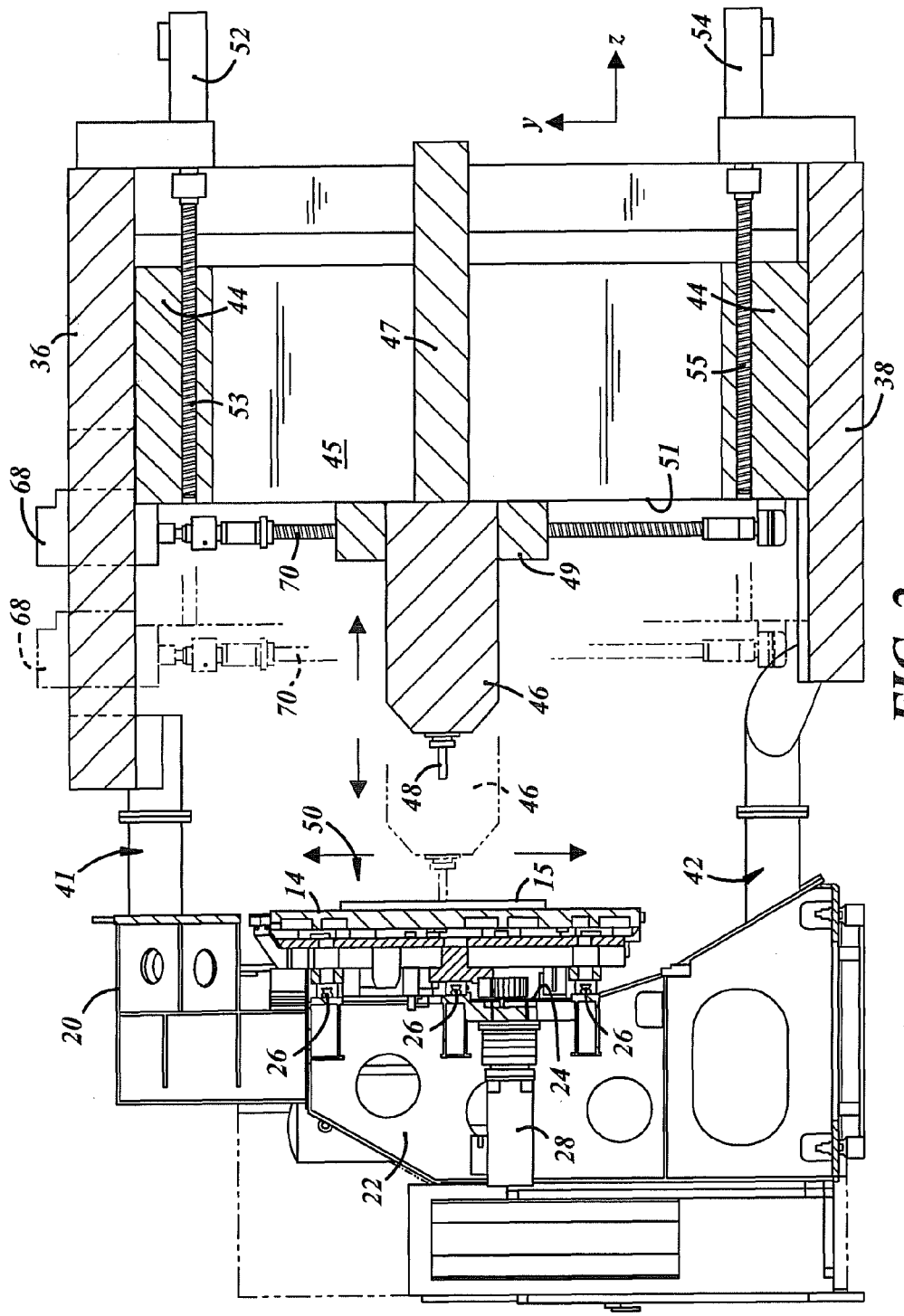
FIG. 2 is a sectional view taken along line 2-2 of FIG. 1 showing in phantom the movement of the Y-axis column and the headstock toward the workpiece.

The Y-axis column 44 carries a vertically movable Y-axis slide or saddle 49, best seen in FIG. 2 that is mounted in a center opening 45 of the bifurcated column 44. The Y-axis slide 49 is mounted on vertical linear guides or ways not shown, that are formed on the rear face 51 of the column 44. Y-axis drive elements for moving the headstock 46 vertically comprise servomotors 68 that are mounted on each side of the rear face 51 of the column 44. Each servomotor 68 is coupled to a drive screw 70 and the drive screws 70 engage drive nuts 72 on opposite sides of the slide 49. The servomotors 68 are used to raise and lower the slide 49 to the desired vertical position on the Y-axis column 44. Although not separately shown, feedback sensors for the vertical position of the slide may be located on the column 44 to control and provide a readout of the vertical position of the slide. The Y-axis column 44 is mounted on the Z-axis ways 37 and 39 on the upper and lower Z-axis frame members 36 and 38, respectively.

Referring now to FIG. 2, the Y-axis slide 49 carries the headstock 46, and the tool 48, and is mounted on the Y-axis column 44 to travel in the Y-axis direction only. The Y-axis slide 49 is fixed in the Z direction relative to the Y-axis column 44 and as a result, the unsupported overhang of the headstock 46 does not change for different Z-axis positions of the headstock. Vertical Y-axis ways (not shown) may be provided on the back 51 of the column 44 on either side of the center opening 45 to guide the vertical movement of the slide 49. FIG. 2 shows in phantom the motion of the Y-axis column 44 into the workzone 50 in order to move the headstock 46 toward the workpiece 15.

The Y-axis column 44 is mounted on horizontal Z-axis ways 37 and 39 formed in the upper and lower Z-axis frame members 36 and 38, respectively. Upper and lower Z-axis drive motors 52 and 54 are mounted on the upper and lower Z-axis frame members 36 and 38, respectively, and are used to drive ballscrews 53 and 55 to position the Y-axis column 44 along the Z-axis. Movement of the Y-axis column 44 in the Z direction is used to feed and retract the headstock 46 and the working tool 48 relative to the workpiece 15. The use of the two Z-axis drive motors 52 and 54 provides positive positioning for both the upper and lower ends of the Y-axis column 44, and adds rigidity to Y-axis column.

A rigid closed loop force design is created by the X-axis frame members 20 and 22 at the back of the machine, the upper and lower Z-axis frame members 36 and 38, the connection tubes 41 and 42, and the vertical Z-axis frame members 35 at the front of the machine. The rigid, closed force loop design produces less distortion in the machine caused by the force of the working tool against the workpiece compared to the distortion in a machine in which a closed loop force design is not used. Distortion in machines in which the portions of the machine supporting the workpiece and the headstock are connected only by the base of the machine is exaggerated when the working tool is forced against the top of the workpiece because of the increasing length of the moment arms involved.

Having thus described the invention, various alterations and modifications may be apparent to those skilled in the art, which modifications and alterations are to be considered to be within the scope of the invention as defined by the appended claims.

The invention claimed is:

1. A rigid design for a machine tool having perpendicular X, Y, and Z axes, comprising:
   fixed X-axis frame members;
   a vertical fixed X-axis wall supported by the X-axis frame members for supporting a workpiece on a vertical face of the vertical fixed X-axis wall for movement of the workpiece in the X-axis direction;
   fixed Z-axis vertical frame members;
   fixed upper and lower Z-axis frame members rigidly attached to the fixed X-axis frame members and the fixed Z-axis vertical frame members, whereby the fixed X-axis frame members, the fixed Z-axis vertical frame members, and the upper and lower Z-axis frame members comprise a closed force loop design;
   a movable Y-axis column extending from the upper Z-axis frame member to the lower Z-axis frame member and movable in the Z-axis direction, which Z-axis direction is perpendicular to the vertical face;
   a headstock mounted on the Y-axis column and having a longitudinal direction extending in the Z-axis direction; and,
   at least one drive motor for moving the Y-axis column in the Z-axis direction, whereby the headstock may be advanced and retracted along the Z-axis direction relative to the workpiece by moving the Y-axis column relative to the workpiece.

2. The machine tool design of claim 1 further comprising: drive elements mounted on the movable Y-axis column for moving the headstock vertically along the Y-axis.

3. The machine tool design of claim 1 wherein the headstock is fixed in the Z direction relative to the column, and motion of the headstock in the Z direction is accomplished by motion of the Y-axis column in the Z direction, whereby the amount of unsupported portion of the headstock relative to the Y-axis column does not change as the Z-axis position of the headstock changes relative to the workpiece.

4. The machine tool design of claim 1
   wherein the at least one drive motor comprises a pair of drive motors used to move the Y-axis column relative to the workpiece, one drive motor being arranged to move the bottom of the Y-axis column, the other drive motor being arranged to move the top of the Y-axis column.

5. The machine tool of claim 1
   wherein the Y-axis column is a bifurcated column having a center opening.

6. The machine tool of claim 5 wherein the headstock is mounted in the center opening of the Y-axis column.

7. The machine tool design of claim 5 further comprising:
   a slide mounted in the opening of the Y-axis column, and the headstock being mounted on the slide; and,
   drive screws and Y-axis drive screw motors comprising drive elements for moving the headstock vertically along the Y-axis;
   drive nuts being mounted on the slide, the drive screws being threaded into the drive nuts, whereby the rotation of the drive screws causes the slide and the headstock to raise and lower relative to the Y-axis column.

8. The machine tool of claim 7 wherein the amount of unsupported portion of the headstock relative to the Y-axis column does not change as the Z-axis position of the headstock changes relative to the workpiece.

9. The machine tool of claim 7 wherein the headstock is a spindle.

10. The machine tool of claim 7 wherein the headstock is a multi-axis head for pivoting a tool about multiple axes.

* * * * *